(12) United States Patent
Wieners

(10) Patent No.: US 9,516,226 B2
(45) Date of Patent: Dec. 6, 2016

(54) EYECUP SWITCHED OPTICAL DEVICE

(71) Applicant: Sensors Unlimited, Inc., Princeton, NJ (US)

(72) Inventor: John Angelo Wieners, Morrisville, PA (US)

(73) Assignee: SENSORS UNLIMITED, INC., Princeton, NJ (US)

(*) Notice: Subject to any disclaimer, the term of this patent is extended or adjusted under 35 U.S.C. 154(b) by 37 days.

(21) Appl. No.: 14/597,837

(22) Filed: Jan. 15, 2015

(65) Prior Publication Data

US 2016/0212340 A1 Jul. 21, 2016

(51) Int. Cl.
*H04N 5/222* (2006.01)
*G03B 17/00* (2006.01)
(Continued)

(52) U.S. Cl.
CPC .......... *H04N 5/23241* (2013.01); *G02B 5/005* (2013.01); *G02B 23/12* (2013.01); *G02B 27/017* (2013.01); *G02B 27/0176* (2013.01); *G02B 27/022* (2013.01); *H01H 1/00* (2013.01); *H04N 5/23203* (2013.01); *H04N 5/23293* (2013.01); *G02B 2027/0187* (2013.01); *G06F 1/3265* (2013.01)

(58) Field of Classification Search
CPC  H04N 5/23293; H04N 5/232; H04N 5/23216; H04N 5/23212; H04N 5/23248; H04N 5/23258; H04N 5/23287; H04N 5/23296; G03B 13/02; G03B 17/20; G03B 13/10; G03B 17/00; G03B 19/12; G06F 3/0416
See application file for complete search history.

(56) References Cited

U.S. PATENT DOCUMENTS 5,635,948 A   6/1997   Tonosaki
5,745,798 A * 4/1998   Hirasawa ............... G03B 13/02
                                                         348/E5.042
(Continued)

FOREIGN PATENT DOCUMENTS

JP    0879658      3/1996
JP    2005070308   3/2005

OTHER PUBLICATIONS

Extended European Search Report dated May 17, 2016 in European Application No. 16151104.3.

*Primary Examiner* — Trung Diep
(74) *Attorney, Agent, or Firm* — Snell & Wilmer LLP

(57) ABSTRACT

An optical device is disclosed. The optical device may generate light for projection into a user's eye. The optical device may have a switch connected to an eyecup. When the eyecup is pressed against the user's face, the switch may be actuated, signaling the optical device to generate light for projection into a user's eye. When the eyecup is not pressed against the user's face, the switch may be unactuated, signaling the optical device to cease to generate light for projection into a user's eye. Various electronics of the optical device may remain active, for example, a controller may continue to generate an image for representation by the generated light, but the optical device may refrain from generating the light, such as by a display. In this manner, inadvertent light leakage may be ameliorated, and power consumption by the optical device lessened when the eyecup is not depressed.

15 Claims, 3 Drawing Sheets

(51) Int. Cl.
*H04N 5/232* (2006.01)
*G02B 23/12* (2006.01)
*G02B 27/01* (2006.01)
*G02B 5/00* (2006.01)
*G02B 27/02* (2006.01)
*H01H 1/00* (2006.01)
*G06F 1/32* (2006.01)

(56) References Cited

U.S. PATENT DOCUMENTS

| 5,842,054 | A | * | 11/1998 | Suzuki | G02B 27/646 |
| | | | | | 348/208.11 |
| 2011/0316847 | A1 | | 12/2011 | Cheng | |
| 2013/0038778 | A1 | * | 2/2013 | Ichimiya | H04N 5/23212 |
| | | | | | 348/349 |
| 2013/0336631 | A1 | | 12/2013 | Kura | |

* cited by examiner

EYECUP SWITCHED OPTICAL DEVICE

FIELD

The present disclosure relates generally to an eyecup switched device, and more specifically to an eyecup switched optical device that selectively generates light in response to the eyecup being depressed.

BACKGROUND

Optical electronics typically produce a visual image for a user to view. However, during times that the user is not viewing the visual image, the optical electronics consume power unnecessarily in order to produce a visual image that the user is not viewing. Moreover, in many optical electronics, such as night vision, it is desirable to eliminate the leakage of light from the optical electronics during times that the user is not viewing the visual image. Prior attempts to address these concerns unnecessarily waste power, such as by blocking light leakage during times that the user is not viewing the visual image but failing to deactivate various light generating components, or lack responsiveness, such as due to delays in detecting that the user is attempting to view a visual image.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "visible light" means any light perceptible by the natural human eye such as due to wavelength or intensity. As used herein, "invisible light" means any light that is not perceptible by the natural human eye, such as infrared light, or ultraviolet light, or light having a wavelength perceptible by the natural human eye, but insufficient intensity to be perceptible by the natural human eye.

Furthermore, any reference to singular includes plural embodiments, and any reference to more than one component or step may include a singular embodiment or step. Surface shading lines may be used throughout the figures to denote different parts but not necessarily to denote the same or different materials.

Figure 1:
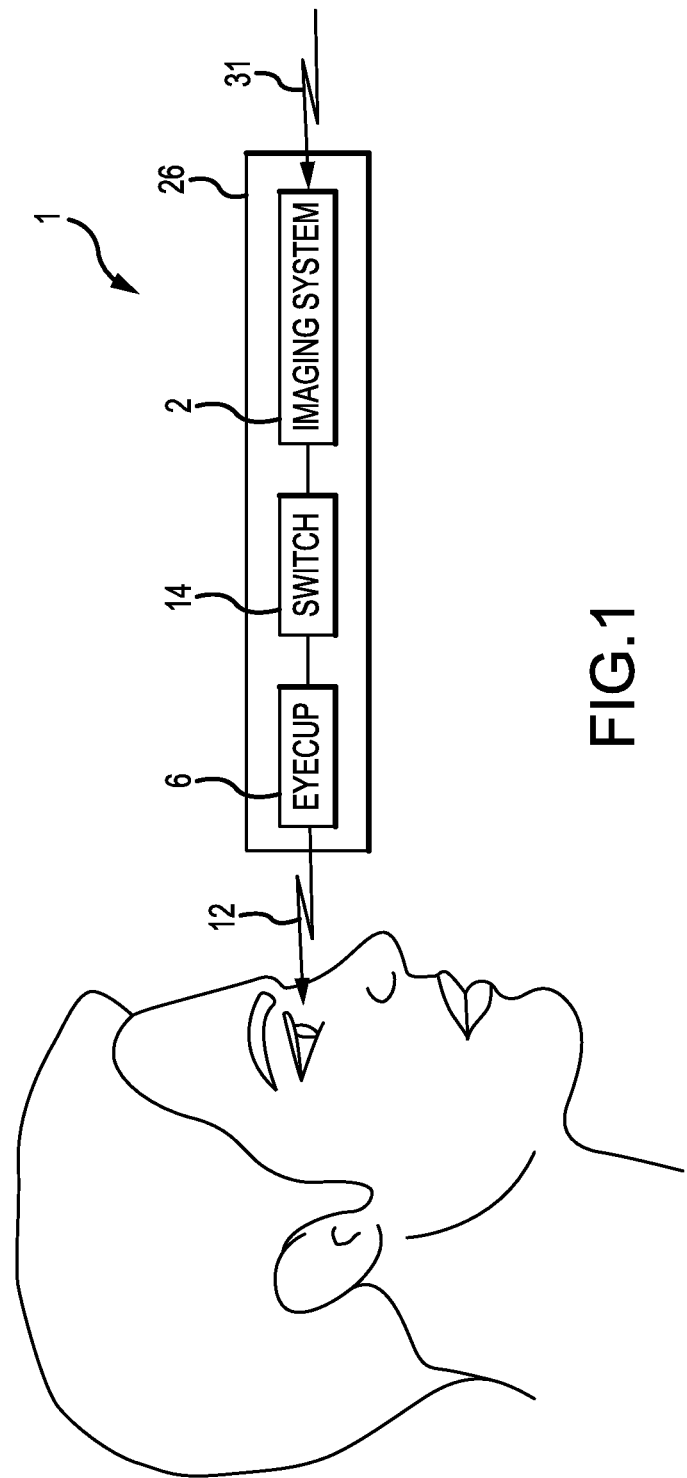
FIG. 1 illustrates a block diagram of an example optical device, according to various embodiments.
Figure 2:
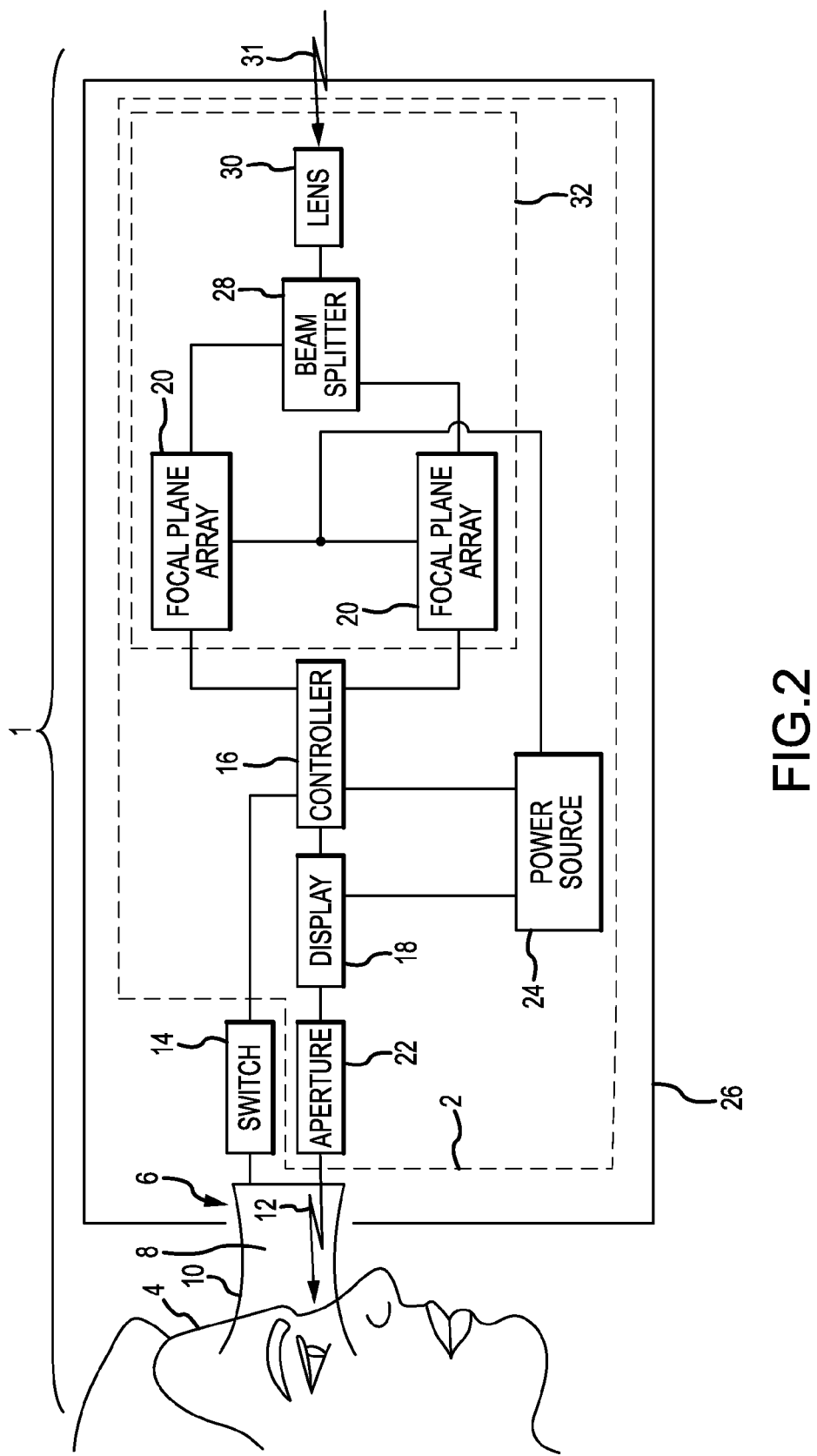
FIG. 2 illustrates a detailed block diagram of an example optical device having an imaging system, according to various embodiments.

With reference to FIGS. 1 and 2, an optical device 1 may comprise any image generating electronics device. For example, an optical device 1 may comprise an infrared system, such as a night vision system. Moreover, an optical device 1 may comprise a weapons sight. In further embodiments, an optical device 1 may comprise a rangefinder, a spotting scope, or an avionics display, or any other image generating electronics device. An optical device 1 may comprise an eyecup 6, a switch 14, and imaging system 2.

An optical device 1 may produce generated light 12. Generated light 12 may comprise a projected image, such as from a display 18, may comprise illumination, such as for crosshairs, or may comprise any light generated by the optical device 1. In further embodiments, generated light 12 further comprises an additional component not generated by the optical device 1, such as light originating outside the optical device 1, that is collected and/or focused by the optical device 1.

At least a portion of an optical device 1 may be pressed against an external actuator 4, as discussed further herein. An external actuator 4 may comprise a surface of an object and/or a human body part, such as a portion of a user's face that may be pressed against the optical device 1 and/or against which the optical device 1 may be pressed, before and/or during viewing of the generated light 12 by the user. For example, an external actuator 4 may comprise a forehead, at least a portion of a superior orbital fissure, or may comprise at least a portion of a supraorbital margin, or a user's spheroid bone, or in general, any portion of a user's body and/or any portion of the user's eye orbit.

An optical device 1 may comprise a housing 26. The housing 26 may comprise an enclosure wherein various components (described below) of the optical device 1 are disposed. Moreover, the housing 26 may be substantially opaque, blocking the unwanted leakage of light. An eyecup 6 (discussed more below) may extend from the housing 26. The eyecup 6 may translate into and/or out of the housing 26 in response to a portion of the eyecup 6 (such as an actuation surface 10) being placed proximate an external actuator 4 and a force applied to the portion of the eyecup 6.

An optical device 1 may comprise an eyecup 6. An eyecup 6 may comprise any mechanism whereby the optical device 1 may be placed proximate the external actuator 4, and eyecup 6 transmits the generated light 12 and further seal the generated light 12 substantially from unwanted leakage. For example, an eyecup 6 may comprise a starburst eyecup. In various embodiments, the eyecup 6 may comprise a substantially cylindrical shape, although in further embodiments, the eyecup 6 may comprise an elliptic cylinder, or a parabolic cylinder, or a hyperbolic cylinder, or a trapezoidal volume, or any shape as desired.

The eyecup 6 may comprise an optical transmission channel 8. The optical transmission channel 8 may comprise a void defined by the body of the eyecup 6 and extending through the eyecup 6 whereby generated light 12 may travel from the optical device 1 to a point on the external actuator 4, which may be a user's eye. The optical transmission channel 8 may comprise a substantially empty void defined by the eyecup 6, although in further embodiments, the optical transmission channel 8 may comprise an optically transmissive material. For example, the optical transmission channel 8 may comprise a solid optically transmissive material, such as a clear plastic, or glass, sapphire crystal, or any other solid as desired. In further embodiments, the optical transmission channel 8 may comprise an optically transmissive liquid, for example, glycerin, or alcohol, or any liquid as desired. In still further embodiments, the optical transmission channel 8 may comprise an optically transmissive gel, or may comprise a gas, such as nitrogen, or air, an inert gas, or a gas purged of water vapor, or any gas as desired.

The eyecup 6 may comprise an actuation surface 10. In various embodiments, the actuation surface 10 comprises a portion of the eyecup 6 designed to receive a translating force imparted by an external actuator 4. For example, the actuation surface 10 may comprise a flange disposed at one end of the external actuator 4 and configured to be pressed into a portion of the user's face. In further embodiments, the actuation surface 10 may comprise a cushioned ring disposed about one end of the eyecup 6. In further embodiments, the actuation surface 10 may comprise a ridge, or a boss, or an edge or any other structure as desired.

The optical device 1 may further comprise a switch 14. A switch 14 may comprise a mechanically operated electrical device having a first electrical continuity. The first electrical continuity changes in response to the mechanical position of the switch 14. For example, the first electrical continuity change may comprise opening a circuit in response to the switch 14 being depressed (or closing a circuit in response to the switch 14 being undepressed). In various embodiments, the first electrical continuity change may comprise closing a circuit in response to the switch 14 being depressed (or opening a circuit in response to the switch 14 being undepressed). Still further alternatively, the first electrical continuity change may comprise momentarily closing then opening (or opening then closing) a circuit in response the switch 14 being at least one of depressed and undepressed. The switch 14 may be in mechanical communication with the eyecup 6. The switch 14 may mechanically operate, thus changing the first electrical continuity, in response to the eyecup 6 at least one of translating into and translating out of the housing 26 as the actuation surface 10 is pressed against an external actuator 4. Thus, the switch may be said to be in slidable communication with the eyecup 6. In further embodiments, the switch 14 may comprise a photo path and a flag, the flag interrupting the photo path in response to the actuation surface 10 being pressed against an external actuator 4. In this manner, the switch 14 may direct the imaging system 2 to produce generated light 12 in substantially instantaneous response to the eyecup begin pressed against an external actuator 4, so that substantially no human perceptible delay is experienced.

The optical device 1 may comprise various imaging system 2. Imaging system 2 may comprise any combination of electronic, mechanical, and optical devices whereby generated light 12 is produced and transmitted through the eyecup 6 in response to the switch 14 being depressed or being undepressed.

The imaging system 2 may comprise a controller 16. A controller 16 may comprise a field programmable gate array. In further embodiments, the controller 16 may comprise a microprocessor, an ASIC, a computer, or any other suitable device. The controller 16 may be in logical connectivity with the switch 14 and with at least one of an aperture 22, a display 18, and/or one or more aspect of the optical input subsystem 32, such as the focal plane array 20, the beam splitter 28, and/or the lens 30. The controller 16 may receive information from and/or transmit information to these devices. For example, the controller 16 may detect the first electrical continuity of the switch 14 and turn a display 18 on or off in response. In this manner, the controller 16 may selectively activate the display 18 when the eyecup 6 is pressed to a user's face for viewing of the generated light 12, and may selectively deactivate the display 18 when the eyecup 6 is not pressed to a user's face, thus saving power and avoiding inadvertent leakage of generated light 12.

The imaging system 2 may comprise a display 18. As briefly mentioned, the display 18 may comprise any light generating device. For example, the display 18 may comprise a liquid-crystal display, or may comprise a light-emitting diode display, or may comprise a cathode-ray tube, or may comprise any device whereby generated light 12, may be produced. The display 18 may comprise a liquid-crystal display with light-emitting diode backlight. In various embodiments, the display 18 produces generated light 12 in response to the controller 16.

The imaging system 2 may further comprise an aperture 22. An aperture 22 may comprise a passageway through which generated light 12 may travel enroute from the display 18 to the optical transmission channel 8 of the eyecup 6. In various embodiments, the aperture 22 may be disposed at the innermost (e.g., disposed closest to/inside of the housing 26) end of the optical transmission channel 8 of the eyecup 6. In various embodiments, the aperture 22 comprises a selectively light transmissive passageway. The aperture 22 may have a selective transmittance status. For example, the aperture 22 may inhibit light transmission (e.g., "closed" transmittance status) or may permit light transmission (e.g., "open" transmittance status). The selective transmittance status may change in response to the actuation surface 10 of the eyecup 6 being pressed to an external actuator 4. For example, as the eyecup 6 translates into the housing 26, the aperture 22 may open, whereas, the aperture 22 may close as the eyecup 6 translates out of the housing 26. Thus, the aperture 22 may be in mechanical communication with the eyecup 6. In further embodiments, the aperture 22 may open or close in response to the switch 14. Thus, the aperture 22 may be in electrical communication with the switch 14, and/or may be in logical communication with the controller 16.

The imaging system 2 may further comprise a power source 24. The power source 24 may comprise a battery. For example, the power source 24 may comprise a lithium-ion battery, a lithium-ion polymer battery, a lead acid battery, a nickel metal hydride battery, a nickel cadmium battery, a fuel cell, ultra-capacitors, super-capacitors or any other apparatus whereby electrical energy may be sourced, for example, a combination of one or more ultra-capacitor and/or super-capacitor and one or more battery. In further embodiments, power source 24 may comprise a transformer, rectifier, external power connection, or any other electrical energy delivery mechanism. The power source 24 may be in electrical communication with at least one of the controller 16, the display 18, the switch 14, and/or the aperture 22. The power source 24 may further be in electrical communication with the optical input subsystem 32, such as the focal plane array 20. In this manner, various aspects of the optical device 1 may receive electrical energy.

The imaging system 2 may comprise an optical input subsystem 32. The optical input subsystem 32 may comprise various electronic, mechanical, and optical devices, whereby incipient light 31 is delivered to the controller 16, for processing wherein the generated light 12 is produced in response to the incipient light 31.

An optical input subsystem 32 may comprise a focal plane array 20. A focal plane array 20 may comprise one or more mirrors, lens, piezoelectric device, and/or micromirror device, whereby an image received through a lens 30 may be processed, focused, or otherwise altered enroute to the controller 16. In various embodiments, the focal plane array 20 operates in response to the controller 16. Moreover, the focal plane array 20 may be further responsive to the switch 14. In this manner, the focal plane array 20 may deactivate in response to the eyecup 6 being not pressed to a user's face. In further embodiments, the focal plane array 20 is not deactivated in response to the eyecup 6 being pressed to a user's face, but instead may be placed in a low power state. For example, the focal plane array 20 may be temperature-compensated, such that if it were deactivated, it would require a time delay to be reactivated. In such embodiments, the focal plane array 20 may alternatively be placed in a low power state.

In various embodiments, two focal plane arrays 20 are implemented. For instance, a lens 30 may receive incipient light 31. A beam splitter 28 may divide the incipient light 31 into various components, such as by frequency, by phase, or by any other desired characteristic. The beam splitter 28 may deliver a portion of the incipient light 31 to each of two focal plane arrays 20. In this manner, different portions of the incipient light 31 may be differently processed, focused, or otherwise altered enroute to the controller 16, which then directs the display 18 to produce generated light 12 in response.

The optical input subsystem 32 may comprise a beam splitter 28. A beam splitter 28 may divide the incipient light 31 into various components, such as by frequency, by phase, or by any other desired characteristic. For example, the beam splitter 28 may divide the incipient light 31 by frequency, such as to divide visible and invisible spectrum light for separate processing by separate focal plane arrays 20, or to divide different spectrums of visible light, or different spectrums of invisible light before recombination at a controller 16. In various embodiments, the beam splitter 28 operates in response to the controller 16. Moreover, the beam splitter 28 may be further responsive to the switch 14. In this manner, the beam splitter 28 may deactivated in response to the eyecup 6 being not pressed to a user's face.

The optical input subsystem 32 may comprise a lens 30. A lens 30 may comprise any light focusing apparatus. In further embodiments, the lens 30 may be electronically adjustable, for example, in response to the controller 16. The lens 30 may receive incipient light 31 and may at least one of focus, filter, or otherwise alter the incipient light 31 enroute to a beam splitter 28. In further embodiments, the beam splitter 28 may be omitted and the incipient light 31 may proceed directly from the lens 30 to a focal plane array 20. In still further embodiments, the focal plane array 20 is omitted and the incipient light 31 may proceed directly from the lens 30 to a controller 16.

Figure 3:
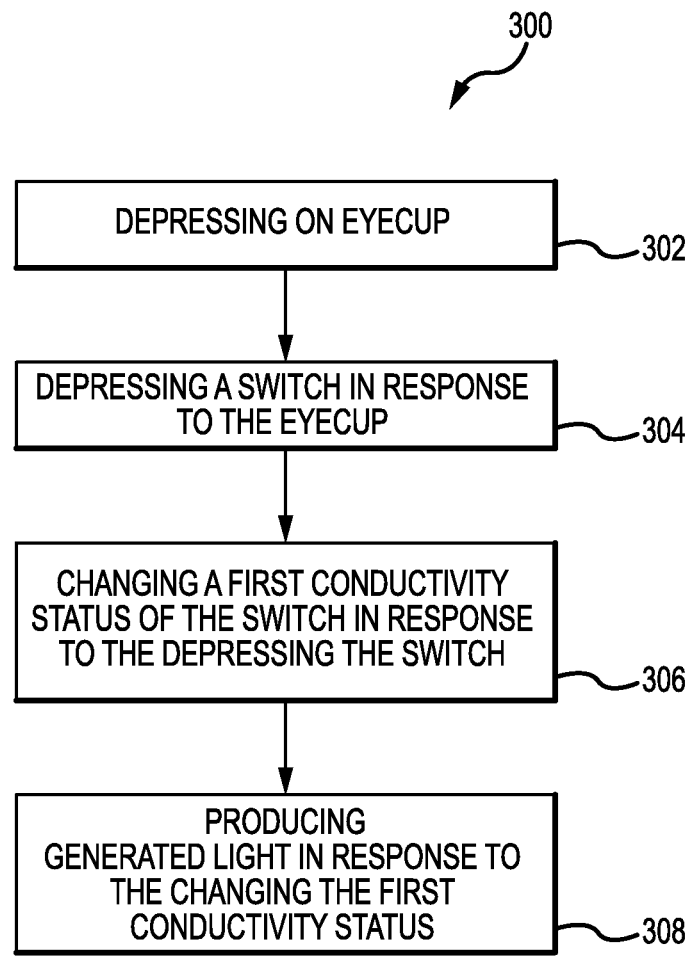
FIG. 3 illustrates a flowchart depicting an example method of producing generated light, according to various embodiments.

With reference to FIGS. 1-2, and FIG. 3, a method 300 of producing generated light is disclosed. The method 300 may include mechanically depressing an eyecup 6 comprising an activation surface, the eyecup 6 in slidable communication with a switch 14 (step 302). The method 300 may further include mechanically depressing the switch 14 in response to the mechanically depressing the eyecup 6 (step 304), and changing a first conductivity status of the switch 14 in response to the mechanically depressing the switch 14 (step 306). Finally, the method 300 may include directing an imaging system 2 to produce generated light 12 in response to the first conductivity status changing (step 308).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An optical device comprising:
    a housing;
    a switch positioned in the housing, whereby an imaging system may be directed to produce generated light in response to the switch being mechanically depressed; and
    an eyecup that is separate from the switch, including an activation surface, the eyecup configured to translate into the housing and mechanically depress the switch in response to force being applied to the activation surface via an external actuator.

2. The optical device according to claim 1, wherein the switch becomes electrically conductive in response to the switch being mechanically depressed.

3. The optical device according to claim 1, wherein the switch becomes electrically non-conductive in response to the switch being mechanically depressed.

4. The optical device according to claim 1, wherein the external actuator comprises at least one of a forehead or an eye orbit.

5. The optical device according to claim 1, further comprising the imaging system and an aperture disposed between the imaging system and the eyecup, wherein the aperture is selectively closable in response to the force being applied to the activation surface.

6. The optical device according to claim 1, wherein the eyecup further comprises an optical transmission channel such that the generated light is conducted through the optical transmission channel.

7. The optical device according to claim 6, wherein the optical transmission channel comprises a transparent solid.

8. The optical device according to claim 1, wherein the imaging system includes:
    a display configured to produce the generated light in response to the imaging system receiving incipient light; and
    a controller in electrical communication with the switch and configured to activate the display in response to the switch being mechanically depressed.

9. The optical device according to claim 8, wherein the incipient light comprises invisible light and wherein the generated light comprises visible light.

10. The optical device according to claim 8, wherein the controller comprises at least one of: a field-programmable gate array, a microcontroller, or an application-specific integrated circuit (ASIC).

11. The optical device according to claim 8, wherein the imaging system further includes:
    a lens configured to focus the incipient light into a focused incipient light; and
    a first focal plane array in optical communication with the controller and configured to receive a first portion of the focused incipient light and to filter the first portion of the focused incipient light,
    wherein the controller directs the display to produce the generated light in response to the first focal plane array.

12. The optical device according to claim 11, further comprising:
    a second focal plane array; and
    a beam splitter configured to split the focused incipient light into at least the first portion and a second portion, to direct the first portion of the focused incipient light to the first focal plane array, and to direct the second portion of the focused incipient light to the second focal plane array,
    wherein the second focal plane array is in optical communication with the controller and configured to receive the second portion of the focused incipient light and to filter the second portion of the focused incipient light, and
    wherein the controller is configured to direct the display to produce the generated light in response to the first focal plane array filtering the first portion of the focused incipient light and the second focal plane array filtering the second portion of the focused incipient light.

13. The optical device according to claim 12, wherein the first portion of the focused incipient light includes invisible light and the second portion of the focused incipient light includes visible light.

14. The optical device according to claim 13, wherein the generated light includes visible light.

15. A method of producing generated light comprising:
    mechanically depressing an eyecup comprising an activation surface such that at least a portion of the eyecup translates into a housing in response to a force being applied to the activation surface, the eyecup being in slidable communication with a switch that is separate from the eyecup;
    mechanically depressing the switch by the eyecup in response to the force being applied to the activation surface of the eyecup;
    changing a first conductivity status of the switch in response to the mechanically depressing the switch; and
    directing an imaging system to produce the generated light in response to the first conductivity status changing.

* * * * *